July 15, 1952  H. G. PUTTICK  2,603,756
APPARATUS FOR GENERATING ELECTRICITY
Filed July 6, 1951
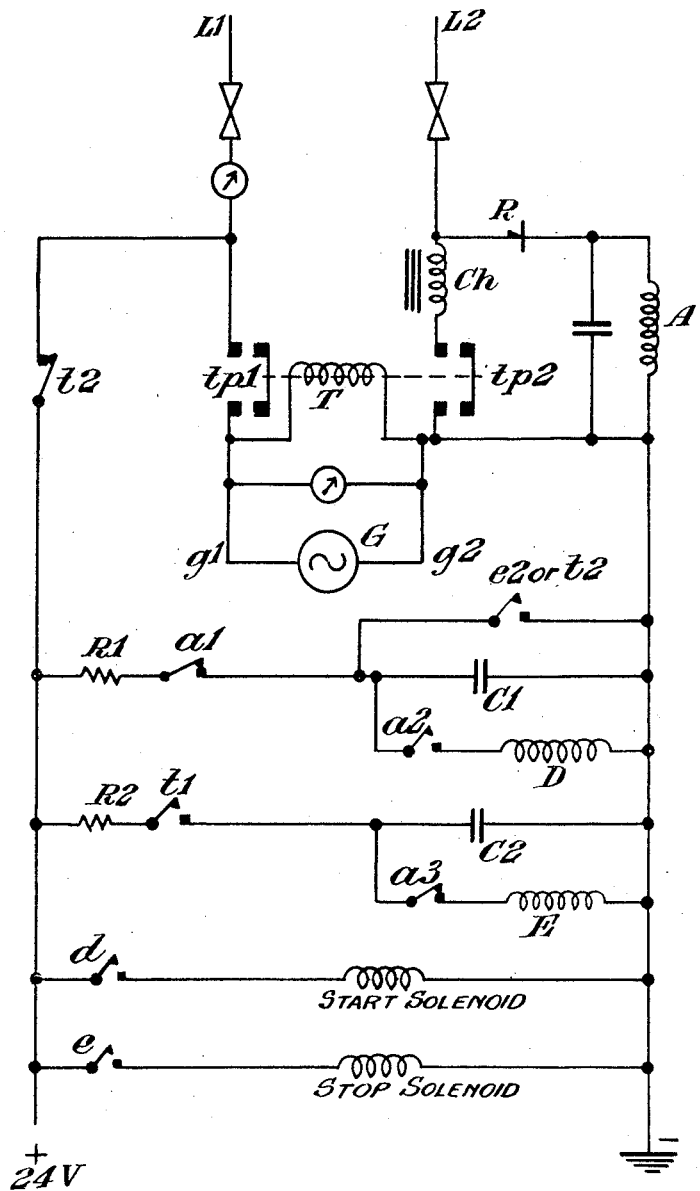
Inventor:
Harold Grahame Puttick,
By his attorneys,
Baldwin & Wight Patented July 15, 1952

2,603,756

UNITED STATES PATENT OFFICE 2,603,756

APPARATUS FOR GENERATING ELECTRICITY

Harold Grahame Puttick, Upper Deal, England, assignor to Petbow Limited, Sandwich, England, a British company Application July 6, 1951, Serial No. 235,543
In Great Britain July 10, 1950

18 Claims. (Cl. 290—30)

This invention relates to apparatus for generating electricity and particularly to that type of apparatus in which, when there is no call for electricity the generator is at rest, but is started as soon as such call occurs and is again stopped when the demand for electricity ceases.

In apparatus of the above particular type, there is usually provided a source of direct current connected in series with the winding of a main controlling relay and the load circuit. This main controlling relay, when operated as the result of the operation of a switch to connect a consuming device (lamp or other device) to the load circuit brings about the starting of an internal combustion engine to drive a generator, usually an alternator. When the generator is supplying power to the load circuit, the direct current from the source of such is cut out and the main controlling relay is held operated by current derived from that flowing from the generator to the load circuit, so that the main controlling relay now depends, for its continued operation, upon such flow of current in the load circuit, that is, ultimately upon there being a consuming device connected to the load circuit. As soon as all consuming devices are switched off, and consequently no current from the generator is flowing in the load circuit, the main controlling relay is de-energised and released, thereby bringing about the stopping of the internal combustion engine. Apparatus as described in this paragraph is "apparatus of the type referred to" when that phrase is used herein.

The present invention relates particularly to an improved circuit arrangement, controlled mainly or in part by the main controlling relay, for respectively starting and stopping the internal combustion engine, the improvement being directed, in general, to ensuring that the time that current is applied to the engine starting device is automatically determined, that (and this is particularly important if the internal combustion engine is a diesel engine) the engine stopping device shall be operated for a sufficiently long time to ensure stopping in spite of the fact that the engine is hot and might, if the stopping device were released too soon, start up again, and that if after all consuming devices have been switched off (and stopping conditions have been thereby initiated) it will not be necessary for the stopping cycle to be completed before current is again supplied to the load circuit.

According to a principal feature of this invention, apparatus of the type referred to includes a first normally-closed contact of the main controlling relay in series with a first condenser and with the source of direct current, and a normally-open contact of the main controlling relay in series with an engine starting relay connected across said first condenser.

According to another principal feature of the invention apparatus of the type referred to includes a first normally-open contact of a contactor device (whose winding is connected across the generator) in series with a second condenser, and a second normally-closed contact of the main controlling relay in series with an engine stopping relay connected across said second condenser.

In apparatus embodying both said principal features of the invention, a pair of normally open contacts of said engine stopping relay, or preferably, of said contactor device may be connected across said first condenser thereby to prevent charging of said first condenser during the engine stopping cycle.

In apparatus embodying either or both of the said principal features, in which the generator is an alternator, there may be connected in series with the load circuit at a position in which current flows from said generator only when a consuming device is switched in, a pre-saturated choke across which is connected the winding of the main controlling relay in series with a rectifier.

A circuit according to the invention is illustrated in the accompanying drawing. In the circuit illustrated, a source of direct current (not shown) has one of its terminals, as shown the positive terminal, connected to a first terminal L1 of the load circuit (not shown) through a normally-closed contact $t2$ of a contactor device and its other terminal (—) connected to the other terminal L2 of the load circuit through the winding of a main controlling relay A and a rectifier R. An alternating current generator G has one terminal $g1$ connected through normally-open power contacts $tp1$ of said contactor device, to said one terminal L1 of the load circuit and its other terminal $g2$ connected, through other normally-open power contacts $tp2$ of said contactor device and a pre-saturated choke in series with each other, to the said other terminal L2 of the load circuit. The said other terminal $g2$ of the alternating current generator is connected to the said other terminal (—) of the source of direct current. A contactor-operating solenoid T is connected across the terminals of the alternator.

There is also connected from said one terminal of the source of direct current to the other terminal of said source a circuit comprising a first resistor R1 in series with a normally-closed contact $a1$ of the main controlling relay A in series with three circuit elements, namely (1) a normally-open contact $e2$ of an engine stopping relay or, preferably $t2$ of the contactor device, (2) a first condenser C1, and (3) a normally-open contact $a2$ of the main controlling relay A in series with the winding of an engine starting relay D, these last three circuit elements being connected in parallel with each other.

There is further connected from said one terminal of the source of direct current to the other terminal of said source a circuit comprising a second resistor R2 in series with a normally-open contact t1 of the contractor in series with two circut elements, namely (1) a second condenser C2, and (2) a normally-closed contact a3 of the main controlling relay in series with the winding of an engine stopping relay E, these last two circuit elements being in parallel with each other.

The engine starting relay D has a normally-open contact d connected in series with an engine starting solenoid, these two elements being connected to opposite terminals of the source of direct current. The engine stopping relay E has a normally-open contact connected in series with a fuel rack shut-off solenoid, or other stopping device, those two elements being likewise connected to opposite terminals of the source of direct current.

The operation of the system according to my invention is as follows; condenser C1 is held charged by reason of its being connected in series with resistor R1 and normally-closed contacts a1 of the main controlling relay A across the terminals of the source of direct current. When a consuming device switch (not shown) in the load circuit is closed, current flows from the source of direct current, through the contact t2, the switch and consuming device, rectifier R, and the main controlling relay A, and back to the source. The main controlling relay A thereupon operates and at contact a1 opens the charging circuit of condsenser C1, and at contact a2 closes a discharging circuit through the winding of the engine starting relay D. The engine starting relay closes its contacts d thereby energising the engine starting solenoid. The capactiy of the condenser and the impedance of the engine starting relay together determines the duration of time that the engine starting solenoid shall be energised.

When the engine has been started and the alternator is being driven, current flows from the alternator through the winding T of the contactor device so that the contactor device energises and operates its contacts. Of those contacts tp1 and tp2 connect the alternator G to the load circuit (in series with which it will be recalled, there is connected a pre-saturated choke ch), whilst contacts t2 of the contactor device open the circuit from the source of direct current to the load circuit, and contacts t1 close a charging circuit through resistor R2 to condenser C2. The disconnection of the source of direct current from the load circuit deprives the main control relay of current from this source; this relay however, receives current due to the drop of potential across the pre-saturated choke ch so that, as long as the alternator is supplying current to the load, the main control relay remains operated, the holding current remaining substantially constant irrespectively of the load current.

When all current-consuming devices have been switched out, and consequently no current is flowing in the load circuit, the main controlling relay A de-energises, and prepares a discharge circuit for condenser C2 in series with the engine stopping relay E. However, condenser C2 does not discharge through the winding of the engine stopping relay until the speed of the alternator falls so low that the contactor-operating solenoid T receives insufficient current to maintain it operated. Until the contactor de-energises, the second condenser remains connected, by contact t1, across the source of direct current so that it is continually under charging conditions, and the contactor maintains a circuit for the engine stopping relay E so that the engine stopping relay is in fact energised from the source of direct current. When the speed of the alternator G falls so low that the contactor winding is de-energised, condsenser C2 is disconnected from the direct current source and is thus able to discharge through the engine stopping relay. The total time of energisation of the engine stopping relay is thus the sum of the time that the contactor-operating solenoid T remains energised and the time that condenser C2 takes to discharge. Thus the engine stopping relay is not directly dependent on the charge in condenser C2 for energisation, since contact t1 of the main contactor device remains closed for a considerable part of the running-down time of the engine and therefore the engine stopping relay is directly operated from the source of direct current, condenser C2 having only a much shorter remaining time to hold the engine stopping relay energised. This arrangement has an important advantage, in that the size of condenser C2 is brought within practicable limits in spite of the considerable time required (especially in the case of diesel engines) for the engine speed to become too low for the engine to restart. It has also another important advantage which, so far as I am aware, cannot be obtained in any other way, viz: it may be that within a few seconds of all load being switched off, the same or another consuming device is required to be switched on. By any other method than that described above the full cycle of stopping operations would have to take place so that the engine could not start again till the full shut-off period had elapsed. By my method of operation the engine stopping relay E is disconnected by contact a3 of the main controlling relay A immediately a consuming device is switched on again, and the engine starting relay D is prevented from functioning by virtue of condenser C1 having been short circuited by contacts e2 on the engine stopping relay E or t2 of the contactor device. The engine thus starts again immediately by its own momentum.

It has been indicated above, that it is preferred to connect a contact t2 of the contactor, rather than a contact e2 of relay E, across the elements C1 and a2 in series with D. The function remains the same, i. e. it prevents charging of the first condenser during the engine stopping cycle, because due to the inherent characteristics of its magnetic circuit the contactor does not fall out until the engine has almost come to rest. In that respect the contact t2 behaves in the same way as does contact e2. It provides, however, one important advantage as follows.

The charge on condenser C1 holds starting relay D energised for a period dependent upon the characteristics of the condenser and of the winding of relay D. This period cannot readily be varied in use of the apparatus, and it must therefore be of sufficient duration to ensure that the engine shall start under the worst possible conditions. This is usually about ten seconds. However, if the engine is hot it can be expected to start within one second, and may indeed be capable of starting itself. On many occasions, therefore the engine may be turned over either unnecessarily or for unnecessarily long periods. This is not good for the engine and unnecessarily drains the battery, particularly with a plant which is required to be continually started and stopped.

It is therefore desirable that some means be provided for varying the starting-time-cycle, making it short when the engine is hot and long when conditions are adverse. In all ordinary circumstances this would call for elaborate thermal relays.

The use of a contact, contact $t2$, on the contactor device, in place of a contact, contact $e2$, in relay E provides exactly what is required with no additional complications.

The operation will be understood from the following: The characteristics of the contactor device are such, that although (on a 230 volt plant) it is rated for 230 volts 50 cycles per second it will if the number of cycles be as low as ten per second pull in at a very low voltage say 90 volts. Now, in an engine which is run up to speed by the starter motor the C./S. rise from zero to 50 more or less in proportion to the rise in voltage, so that due to the low periodicity the contactor will pull in quite early. The time at which this pulling-in occurs is obviously a function of the speed at which the engine is motored up.

If the engine is cold, or if for any reason, the speed of the motor remains low, the contactor would not pull in during motoring, the voltage and C./S. of the generator being too low. Contact $t2$ would therefore remain open and the starting relay D would be held operated for the full period of ten seconds, as determined by the capacity and characteristics of condenser $c1$ and of relay D.

If, on the contrary, the engine were hot the speed would rise quickly to provide an alternator potential say 90 volts at 15 C./S. the contactor would pull in within a second or so, condenser $c1$ would be short circuited and the start time cycle would be cancelled or reduced.

It will therefore be seen that the use of contact $t2$ in this circuit provides an automatic variable time delay to the start circuit which is directly related to the external conditions affecting the starting of the engine.

I claim:

1. Apparatus for supplying electricity to a load circuit of the kind in which a generator is at rest when there is no call for electricity including in combination, a generator, a contactor device, an energising winding for said contactor device, connections connecting said winding across said generator, connections including normally-open contacts of said contactor device connecting said generator to said load, a source of direct current, a connection including a normally-closed contact of said contactor device connecting one terminal of said source to one terminal of said load circuit, a main control relay, a connection including the winding of said main control relay connecting the other terminal of said source to the other terminal of said load circuit, a first condenser, a charging circuit for said first condenser including a first normally-closed contact of said main control relay, an engine starting relay, a discharging circuit for said first condenser including a normally-open contact of said main control relay, a second condenser, a charging circuit for said second condenser including a normally-open contact of said contactor device, an engine-stopping relay, and a discharging circuit for said second condenser including a second normally-closed contact of said main control relay.

2. Apparatus for supplying electricity to a load circuit of the kind in which a generator is at rest when there is no call for electricity including in combination, a generator, a contactor device, an energising winding for said contactor device, connections connecting said winding across said generator, a connection including one normally-open power contact of said contactor device connecting one terminal of said generator to one terminal of said load circuit, a connection including a second normally-open power contact of said contactor device connecting the other terminal of said generator to the other terminal of said load circuit, a source of direct current, a connection including a normally-closed contact of said contactor device connecting one terminal of said source to said one terminal of said load circuit, a main control relay, a connection including the winding of said main control relay connecting the other terminal of said source to said other terminal of said load circuit, a first condenser, a charging circuit for said first condenser including a first normally-closed contact of said main control relay, an engine starting relay, a discharging circuit for said first condenser including a normally-open contact of said main control relay, a second condenser, a charging circuit for said second condenser including a normally-open contact of said contactor device, an engine stopping relay, and a discharging circuit for said second condenser including a second normally-closed contact of said main control relay.

3. Apparatus for supplying electricity to a load circuit of the kind in which a generator is at rest when there is no call for electricity including in combination, a generator, a contactor device, an energising winding for said contactor device, connections connecting said winding across said generator, a connection including one normally-open power contact of said contactor device connecting one terminal of said load circuit, a connection including a second normally-open power contact of said contactor device connecting the other terminal of said generator to the other terminal of said load circuit, a saturated choke connected between said second normally-open contact of said contactor device and said other terminal of said load circuit, a source of direct current, a connection including a normally-closed contact of said contactor device connecting one terminal of said source to said one terminal of said load circuit, a main control relay, a connection including the winding of said main control relay connecting the other terminal of said source to said other terminal of said load circuit, a first condenser, a charging circuit for said first condenser including a first normally-closed contact of said main control relay, an engine starting relay, a discharging circuit for said first condenser including a normally-open contact of said main control relay, a second condenser, a charging circuit for said second condenser including a normally-open contact of said contactor device, an engine-stopping relay, and a discharging circuit for said second condenser including a second normally-closed contact of said main control relay.

4. Apparatus for supplying electricity to a load circuit of the kind in which a generator is at rest when there is no call for electricity including in combination, a generator, a contactor device, an energising winding for said contactor device, connections connecting said winding across said generator, a connection including one normally-open power contact of said contactor device connecting one terminal of said generator to one terminal of said load circuit, a connection including a second normally-open power contact of said contactor device connecting the other terminal of said generator to the other terminal of said load circuit, a saturated choke connected between said second normally-open contact of said contactor device and said other terminal of said load circuit, a main ocntrol relay, a rectifier connected in series with said main control relay, a connection including the winding of said main control relay connecting the other terminal of said source to said other terminal of said load circuit, a connection connecting said other terminal of said source to the other terminal of said generator, a first condenser, a charging circuit for said first condenser including a first normally-closed contact of said main control relay, an engine starting relay, a discharging circuit for said first condenser including a normally-open contact of said main control relay, a second condenser, a charging circuit for said second condenser including a normally-open contact of said contactor device, an engine stopping relay, and a discharging circuit for said second condenser including a second normally-closed contact of said main control relay.

5. Apparatus for supplying electricity to a load circuit of the kind in which a generator is at rest when there is no call for electricity including in combination a generator, a contactor device, an energising winding for said contactor device, connections connecting said winding across said generator, a connection including one normally-open power contact of said contactor device connecting one terminal of said generator to one terminal of said load circuit, a connection including a second normally-open power contact of said contactor device connecting the other terminal of said generator to the other terminal of said load circuit, a source of direct current, a connection including a normally closed contact of said contactor device connecting one terminal of said source to said one terminal of said load circuit, a main control relay, a connection including the winding of said main control relay connecting the other terminal of said source to said other terminal of said load circuit, a first condenser, connections including a first normally closed contact of said main control relay connecting said first condenser to said source of direct current to provide a charging circuit for said first condenser, an engine starting relay, a discharging circuit for said first condenser including a normally-open contact of said main control relay, a second condenser, a charging circuit for said second condenser including a normally-open contact of said contactor device, an engine stopping relay, and a discharging circuit for said second condenser including a second normally closed contact of said main control relay.

6. Apparatus for supplying electricity to a load circuit of the kind in which a generator is at rest when there is no call for electricity including in combination, a generator, a contactor device, an energising winding for said contactor device, connections connecting said winding across said generator, a connection including one normally-open power contact of said contactor device connecting one terminal of said generator to one terminal of said load circuit, a connection including a second normally-open power contact of said contactor device connecting the other terminal of said generator to the other terminal of said load circuit, a source of direct current, a connection including a normally-closed contact of said contactor device connecting one terminal of said source to said one terminal of said load circuit, a main control relay, a connection including the winding of said main control relay connecting the other terminal of said source to said other terminal of said load circuit, a first condenser, a charging circuit for said first condenser including a first normally-closed contact of said main control relay, an engine starting relay, a discharging circuit for said first condenser including a normally-open contact of said main control relay, a second condenser, connections including a normally-open contact of said contactor device connecting said second condenser to said source of direct current to provide a charging circuit for said second condenser, an engine-stopping relay, and a discharging circuit for said second condenser including a second normally-closed contact of said main control relay.

7. Apparatus for supplying electricity to a load circuit of the kind in which a generator is at rest when there is no call for electricity including in combination a generator, a contactor device, an energising winding for said contactor device, connections connecting said winding across said generator, a connection including one normally-open power contact of said contactor device connecting one terminal of said generator to one terminal of said load circuit, a connection including a second normally-open power contact of said contactor device connecting the other terminal of said generator to the other terminal of said load circuit, a source of direct current, a connection including a normally-closed contact of said contactor device connecting one terminal of said source to said one terminal of said load circuit, a main control relay, a connection including the winding of said main control relay connecting the other terminal of said source to said other terminal of said load circuit, a first condenser, connections including a first normally-closed contact of said main control relay connecting said first condenser to said source of direct current to provide a charging circuit for said first condenser, an engine starting relay, a discharging circuit for said first condenser including a normally-open contact of said main control relay, a second condenser, connections including a normally open contact of said contactor device connecting said second condenser to said source of direct current to provide a charging circuit for said second condenser, an engine stopping relay, and a discharging circuit for said second condenser including a second normally-closed contact of said main control relay.

8. Apparatus for supplying electricity to a load circuit of the kind in which a generator is at rest when there is no call for electricity including in combination a generator, a contactor device, an energising winding for said contactor device, connections connecting said winding across said generator, a connection including one normally-open power contact of said contactor device connecting one terminal of said generator to one terminal of said load circuit, a connection including a second normally-open power contact of said contactor device connecting the other terminal of said generator to the other terminal of said load circuit, a source of direct current, a connection including a normally-closed contact of said contactor device connecting one terminal of said source to said one terminal of said load circuit a main control relay, a connection including the winding of said main control relay connecting the other terminal of said source to said other terminal of said load circuit, a first condenser, a charging circuit for said first condenser including a first normally-closed contact of said main control relay, an engine starting relay, a discharging circuit for said first condenser including a normally-open contact of said main control relay, a second condenser, a charging circuit for said second condenser including a normally-open contact of said contactor device, an engine stopping relay, a connection including a first normally-open contact of said engine stopping relay connected across said first condenser, and a discharging circuit for said second condenser including a second normally closed contact of said main control relay.

9. Apparatus for supplying electricity to a load circuit of the kind in which a generator is at rest when there is no call for electricity including in combination a generator, a contactor device, an energising winding for said contactor device, connections connecting said winding across said generator, a connection including one normally open power contact of said contactor device connecting one terminal of said generator to one terminal of said load circuit, a connection including a second normally-open power contact of said contactor device connecting the other terminal of said generator to the other terminal of said load circuit, a source of direct current, a connection including a normally-closed contact of said contactor device connecting one terminal of said source to said one terminal of said load circuit, a main control relay, a connection including the winding of said main control relay connecting the other terminal of said source to said other terminal of said load circuit, a first condenser, a charging circuit for said first condenser including a first normally-closed contact of said main control relay, an engine starting relay, a discharging circuit for said first condenser including a normally-open contact of said main control relay, a second condenser, a charging circuit for said second condenser including a first normally open contact of said contactor device, an engine stopping relay, a connection including a second normally open contact of said contactor device connected across said first condenser, and a discharging circuit for said second condenser including a second normally-closed contact of said main control relay.

10. Apparatus for supplying electricity to a load circuit of the kind in which a generator is at rest when there is no call for electricity including in combination a generator, a contactor device, an energising winding for said contactor device, connections connecting said winding across said generator, a connection including one normally-open power contact of said contactor device connecting one terminal of said generator to one terminal of said load circuit, a connection including a second normally-open power contact of said contactor device connecting the other terminal of said generator to the other terminal of said load circuit, a source of direct current, a connection including a normally-closed contact of said contactor device connecting one terminal of said source to said one terminal of said load circuit, a main control relay, a connection including the winding of said main control relay connecting the other terminal of said source to said other terminal of said load circuit, a first condenser, a charging circuit for said first condenser including a first normally-closed contact of said main control relay, an engine starting relay, an engine starting solenoid, connections including normally-open contacts of said engine starting relay connecting said engine-starting solenoid to said source of direct current, a discharging circuit for said first condenser including a normally-open contact of said main control relay, a second condenser, a charging circuit for said second condenser including a normally-open contact of said contactor device, an engine stopping relay, and a discharging circuit for said second condenser including a second normally-closed contact of said main control relay.

11. Apparatus for supplying electricity to a load circuit of the kind in which a generator is at rest when there is no call for electricity including in combination a generator, a contactor device, an energising winding for said contactor device, connections connecting said winding across said generator, a connection including one normally-open power contact of said contactor device connecting one terminal of said generator to one terminal of said load circuit, a connection including a second normally-open power contact of said contactor device connecting the other terminal of said generator to the other terminal of said load circuit, a source of direct current, a connection including a normally closed contact of said contactor device connecting one terminal of said source to said one terminal of said load circuit, a main control relay a connection including the winding of said main control relay connecting the other terminal of said source to said other terminal of said load circuit, a first condenser, a charging circuit for said first condenser including a first normally-closed contact of said main control relay, an engine starting relay, a discharging circuit for said first condenser including a normally-open contact of said main control relay, a second condenser, a charging circuit for said second condenser including a normally-open contact of said contactor device, an engine stopping relay, an engine stopping solenoid, connections including normally-open contacts of said engine stopping relay connecting said engine stopping solenoid to said source of direct current, and a discharging circuit for said second condenser including a second normally closed contact of said main control relay.

12. Apparatus for supplying electricity to a load circuit of the kind in which a generator is at rest when there is no call for electricity including in combination, a generator, a contactor device, an energising winding for said contactor device, connections connecting said winding across said generator, a connection including one normally-open power contact of said contactor device connecting one terminal of said generator to one terminal of said load circuit, a connection including a second normally-open power contact of said contactor device connecting the other terminal of said generator to the other terminal of said load circuit, a source of direct current, a connection including a normally closed contact of said contactor device connecting one terminal of said source to said one terminal of said load circuit, a main control relay, a connection including the winding of said main control relay connecting the other terminal of said source to said other terminal of said load circuit, a first condenser, a charging circuit for said first condenser including a first normally-closed contact of said main control relay, an engine starting relay, an engine starting solenoid, connections including normally-open contacts of said engine starting relay connecting said engine starting solenoid to said source of direct current, a discharging circuit for said first condenser including a normally-open contact of said main control relay, a second condenser, a charging circuit for said second condenser including a normally-open contact of said contactor device, an engine stopping relay, an engine stopping solenoid, connections including normally-open contacts of said engine stopping relay connecting said engine stopping solenoid to said source of direct current, and a discharging circuit for said second condenser including a second normally-closed contact of said main control relay.

13. Apparatus according to claim 3 including a condenser connected across said main control relay.

14. Apparatus according to claim 4 including a condenser connected across said main control relay.

15. Apparatus for supplying electricity to a load circuit of the kind in which a generator is at rest when there is no call for electricity including in combination a generator, a contactor device, an energising winding for said contactor device, connections connecting said winding across said generator, a connection including one normally-open power contact of said contactor device connecting one terminal of said generator to one terminal of said load circuit, a connection including a second normally open power contact of said contactor device connecting the other terminal of said generator to the other terminal of said load circuit, a source of direct current, a connection including a normally closed contact of said contactor device connecting one terminal of said source to said one terminal of said load circuit, a main control relay, a connection including the winding of said main control relay connecting the other terminal of said source to said other terminal of said load circuit, a first condenser, a charging circuit for said first condenser including a series connected first normally-closed contact of said main control relay and a resistance, an engine starting relay, a discharging circuit for said first condenser including a normally open contact of said main control relay, a second condenser, a charging circuit for said second condenser including a normally-open contact of said contactor device, an engine stopping relay and a discharging circuit for said second condenser including a second normally closed contact of said main control relay.

16. Apparatus for supplying electricity to a load circuit of the kind in which a generator is at rest when there is no call for electricity including in combination a generator, a contactor device, an energising winding for said contactor device, connections connecting said winding across said generator, a connection including one normally-open power contact of said contactor device connecting one terminal of said generator to one terminal of said load circuit, a connection including a second normally-open power contact of said contactor device connecting the other terminal of said generator to the other terminal of said load circuit, a source of direct current, a connection including a normally-closed contact of said contactor device connecting one terminal of said source to said one terminal of said load circuit, a main control relay, a connection including the winding of said main control relay connecting the other terminal of said source to said other terminal of said load circuit, a first condenser, a charging circuit for said first condenser including a first normally closed contact of said main control relay, an engine starting relay, a discharging circuit for said first condenser including a normally open contact of said main control relay, a second condenser, a charging circuit for said second condenser including a series connected normally-open contact of said contactor device and a resistance, an engine stopping relay, and a discharging circuit for said second condenser including a second normally-closed contact of said main control relay.

17. Apparatus for supplying electricity to a load circuit of the kind in which a generator is at rest when there is no call for electricity including in combination, a generator, a contactor device, an energising winding for said contactor device, connections connecting said winding across said generator, a connection including one normally-open power contact of said contactor device connecting one terminal of said generator to one terminal of said load circuit, a connection including a second normally-open power contact of said contactor device connecting the other terminal of said generator to the other terminal of said load circuit, a source of direct current, a connection including a normally closed contact of said contactor device connecting one terminal of said source to said one terminal of said load circuit, a main control relay, a connection including the winding of said main control relay connecting the other terminal of said source to said other terminal of said load circuit, a first condenser, a charging circuit for said first condenser including a series connected first normally-closed contact of said main control relay and a first resistance, an engine starting relay, a discharging circuit for said first condenser including a normally-open contact of said main control relay, a second condenser, a charging circuit for said second condenser including a series connected normally-open contact of said contactor device and a second resistance, an engine stopping relay and a discharging circuit for said second condenser including a second normally-closed contact of said main control relay.

18. Apparatus for supplying electricity to a load circuit of the kind in which a generator is at rest when there is no call for electricity including in combination a generator, a contactor device, an energising winding for said contactor device, a source of direct current, a main control relay connected in a circuit between said source of direct current and said load circuit, an engine starting relay, a charged condenser, a contact controlled by said main control relay for discharging said charged condenser through said engine starting relay, and means controlled by said contactor device for preventing recharging of said condenser until said generator is at rest.

HAROLD GRAHAME PUTTICK.

REFERENCES CITED

The following references are of record in the file of this patent:

UNITED STATES PATENTS

| Number | Name | Date |
|---|---|---|
| Re. 15,258 | Ernest | Jan. 3, 1922 |
| 1,662,366 | Cosgray | Mar. 13, 1928 |
| 1,704,996 | Witzel | Mar. 22, 1929 |
| 1,774,492 | Thorne | Aug. 26, 1930 |
| 1,903,712 | Abbink Spaink | Apr. 11, 1933 |
| 2,427,462 | Kaelin | Sept. 16, 1947 |
| 2,510,891 | Hurlburt | June 6, 1950 |